United States Patent [19]

Haist

[11] Patent Number: 4,564,230

[45] Date of Patent: Jan. 14, 1986

[54] RESTRAINT APPARATUS FOR CARGO BOX DOORS

[76] Inventor: Edward A. Haist, Maitland, Ontario, Canada

[21] Appl. No.: 538,344

[22] Filed: Oct. 3, 1983

[30] Foreign Application Priority Data

Oct. 5, 1982 [CA] Canada .................................. 412826

[51] Int. Cl.$^4$ .............................................. E05C 9/08
[52] U.S. Cl. .................................... 292/218; 16/114 R; 24/298; 70/93; 74/544; 296/146; 292/264; 292/DIG. 21; 292/DIG. 27; 292/DIG. 32
[58] Field of Search .................... 70/93, DIG.65, 207, 70/209; 74/543, 544; 292/DIG. 21, DIG. 32, DIG. 29, 264, DIG. 27, 258, 150, 218, 256.5; 16/114 R; 296/146; 24/298–302

[56] References Cited

U.S. PATENT DOCUMENTS

| | | | |
|---|---|---|---|
| 755,551 | 3/1904 | Richardson | 292/DIG. 32 |
| 864,559 | 8/1907 | Rinald | 292/264 |
| 3,544,154 | 12/1970 | Ford | 292/264 X |
| 4,170,376 | 10/1979 | Banerjea | 292/218 |

FOREIGN PATENT DOCUMENTS

| | | | |
|---|---|---|---|
| 338136 | 6/1921 | Fed. Rep. of Germany | 70/93 |
| 554831 | 7/1932 | Fed. Rep. of Germany | 292/264 |
| 23 of | 1875 | United Kingdom | 292/262 |

Primary Examiner—Gary L. Smith
Assistant Examiner—Lloyd A. Gall
Attorney, Agent, or Firm—Curtis Ailes

[57] ABSTRACT

Door-swing restraint apparatus for a pair of latched doors closing an end opening of a cargo box comprises a chain or cable link connected between margins of the doors so that a person actuating a bar to release door latches will not be injured by freight items which bear against the door. One end of the link is fixed in the marginal edge of one door, the other end being fixed to a lever arm which can be selectably engaged with or disengaged from a lateral bracket on the latch bar of the other door, only when the arm is rotated out of its horizontal transport position into the vertical. Rotation of the bar due to torque exerted by a freight item pressing against the door is limited by a stop pin carried by the bar engaged in a slot in a door-mounted journal. The opening swing of the door is limited to a few centimeters as the link becomes taut and the lever arm remains horizontal, visually signalling the hazard.

The lever arm is formed with a side-opening right-angle slot engageable with a pin in the latch bar bracket. In another embodiment the arm carries the pin and the bracket sidewalls are slotted.

6 Claims, 12 Drawing Figures

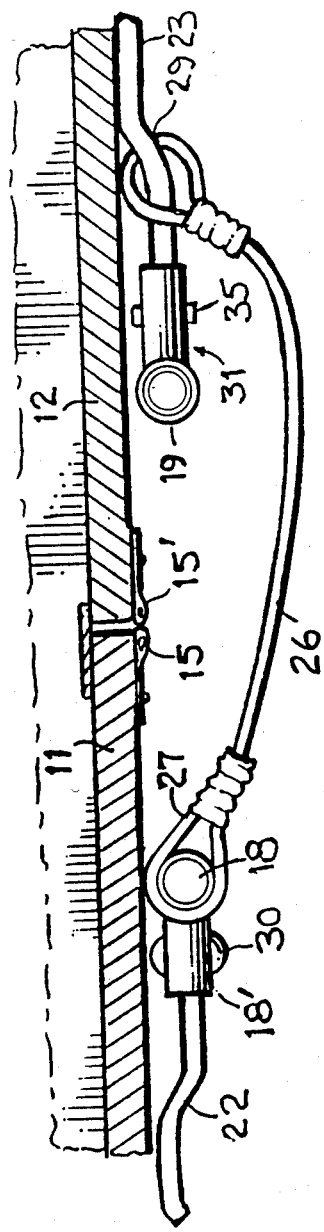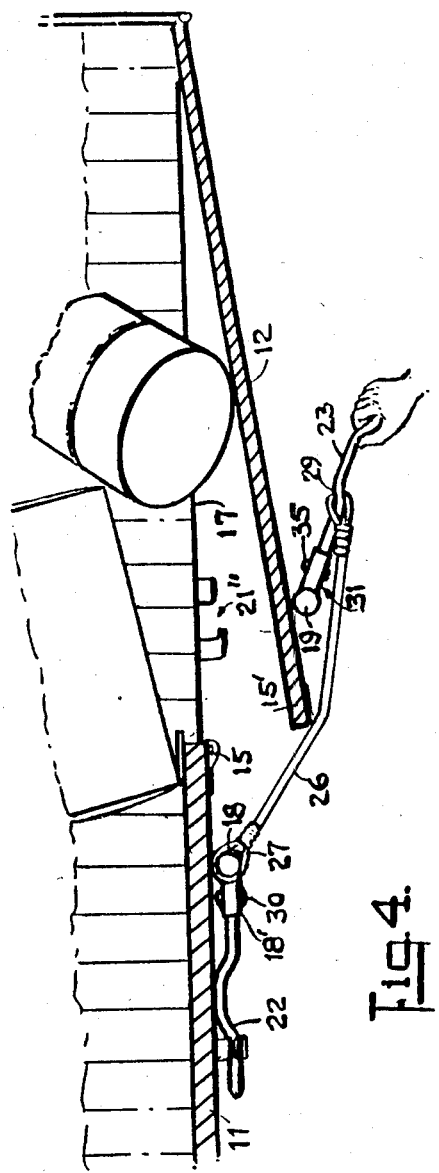

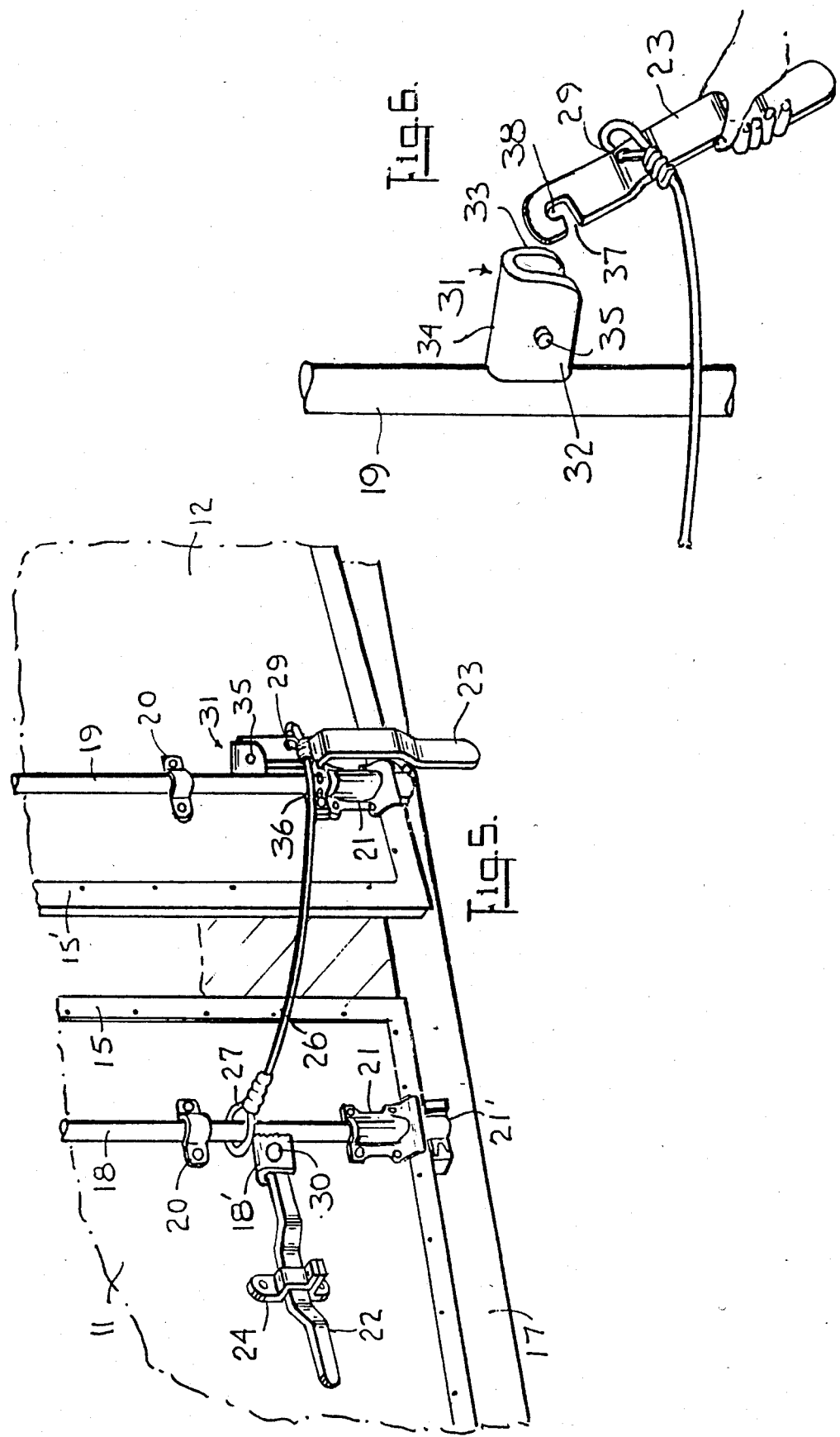

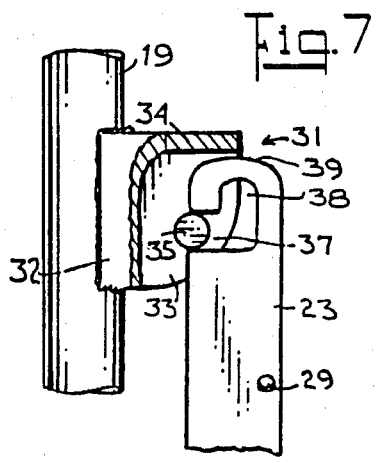
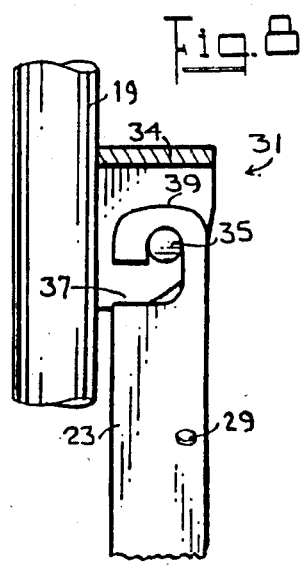
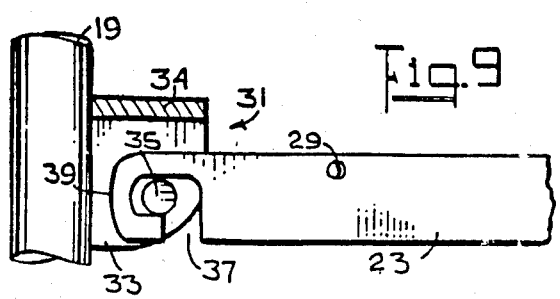
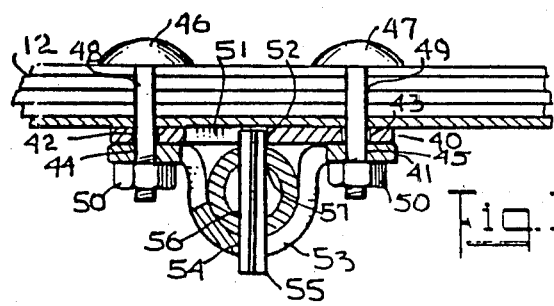
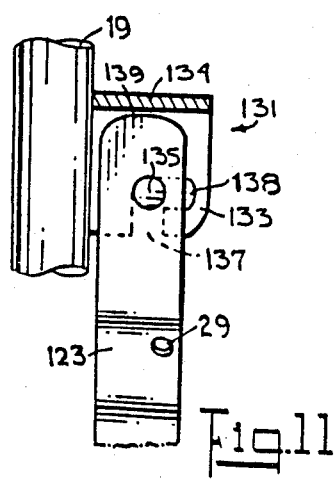
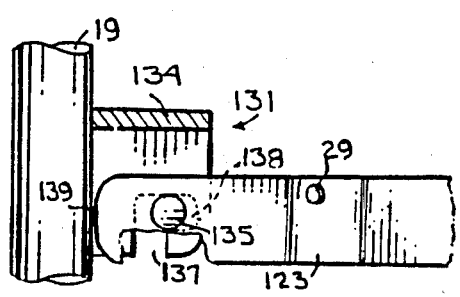

RESTRAINT APPARATUS FOR CARGO BOX DOORS

FIELD OF THE INVENTION

This invention relates to doors for freight vehicles and in particular concerns restraint means associated inseparably with an actuating lever arm for unlatching a door to allow only limited opening swing of the door until the safety of the situation has been reviewed, whereafter the restraint may be removed to allow full opening of the door.

BACKGROUND OF THE INVENTION

Cargo boxes now in use on tractor trailers are usually provided with a pair of rear doors swinging on vertical axis hinges and meeting at the mid-width of the end opening of the box. When the doors are swung fully open the access opening is virtually equal to the box cross-section. After the cargo has been loaded the doors are swung to the closed position and each is latched shut by imparting rotation to a vertical latch bar to cause upper and lower latch jaws to lock in keepers fixed in the door frame. After the doors are closed, no opening exists whereby the state of the cargo may be inspected, for example after a highway trip. It is not uncommon for the cargo to shift; for instance drums or cases may come loose and slide or roll against one or both doors. When a person standing behind the trailer releases the latches holding a door closed, that door may be forcibly driven outward by cargo pressing against it, with risk of serious injury to that person.

Although devices have heretofore been proposed to prevent one or both doors from swinging freely open when unlatched, such as chains connected to the floor and to the inner side of a door, it is undesirable to install anything that could interfere with free rolling of dollies or handling equipment. Moreover, in such arrangement, the person who later actuates the lever arm to unlatch a door cannot know for certain if the device had been properly installed before the door was sealed.

Other devices which have been proposed include chains or cables intended to be connected between the doors externally after they have been closed. While safety to the operator can be assured by properly installing slack links of this kind, instances can arise where they fail to be put on, either through not being available when the doors are sealed, or through human error or neglect.

Various forms of modified latch bar handles have been proposed, and various rotation-limiting stop devices have been patented to minimise risk of injury to an operator's head or hands by a rapidly moving handle. Such devices and apparatuses may be reviewed in Olander U.S. Pat. No. 2,316,359 (1943), Dath U.S. Pat. No. 2,472,146 (1949), Dath U.S. Pat. No. 2,567,366 (1951), Danielson U.S. Pat. No. 2,676,046 (1954), and Olander U.S. Pat. No. 3,329,456 (1967). While such devices are useful in limiting kinetic effects or in reducing handle torque, the overall safety of the operator has not be adequately addressed.

STATEMENT OF THE INVENTION

The objective of the present invention is to provide a novel door restraint apparatus that makes impossible the closing of a cargo box door except by use of a separable lever arm engageable in a modified bracket carried by a latch-actuating bar, the arm having one end of a restraint link affixed to it, the other end of the link being permanently fixed to the other door.

It is an ancillary object to make impossible the opening of a cargo box door except by use of a separable lever arm carrying an end of a restraint link, the lever arm during transport being insertably connected to the latch-actuating bar which is provided with a stop limiting the swing of the arm when the latches are released from their keepers.

According to the invention, a door-swing restraint apparatus is provided which is connectable between a pair of cargo box doors having meeting vertically-extending margins, one end of a restraint link being fixed adjacent the margin of one door and the other being connected to the latch-actuating lever arm of the other door which will be referred to as the restrained door. The link is made just enough longer than the distance between the points of connection of its ends to allow the restrained door when unlatched to be opened only a few centimeters. The lever arm is a bar having one end shaped to allow it to be readily connected to or disconnected from a parallel-sided bracket fixed on the latch bar of the restrained door, only when the bar is in a position other than its normal transport position, i.e. only when vertical if the arm would normally be horizontal when used to rotate the latch bar. When the bar has been rotated sufficiently to unlatch the restrained door, the link allows only a small door-opening swing movement until it is taut. If a weight of cargo is pressing against the door, the operator is protected against injury from a violently swinging door or by cargo falling out.

Additional protection is provided to personnel by limiting stops which restrict rotation of the latch bar in the latch-releasing direction, and hence arrest the rapid initial rotation of the lever arm when cargo bearing against the door exerts torque through interaction of latch claws and keepers. When the stop limit is set to arrest the bar rotation just after the latches are freed from their keepers, usually at about 30° rotation, the lever arm is prevented from impacting the operator's arm or head. Link tension prevents the lever arm from swinging down under its weight, thus providing a clear visual signal of a hazardous cargo state.

By limiting the opening swing of the lever arm to the least practical swing angle, tension in the link develops considerably less torque, and hence reduced force on the stop devices, than if a larger swing angle is permitted.

If cargo is detected to be in a condition hazardous to those unloading the box, or likely to sustain damage by further opening of the door, safe procedures can be followed.

If after initial opening movement it is found that the restrained door may be opened safely, the lever arm is allowed to pivot about a pin extending through the bracket so that it may be disengaged and allowed to hang from the link, which remains connected to the other door.

In carrying the invention into effect, a separable lever arm to which one end of a restraint link is secured is made rectangular or shaped with a flattened end portion and the latch bar bracket comprises a pair of spaced vertical walls lying in planes parallel with the restrained door, the arm end portion being insertable between or removable from between the bracket walls only when it is held vertical, i.e. while the arm is held extending downwardly from the bracket. The bracket side walls are bridged by an integral top wall, the side walls and the top wall being secured as by brazing or welding to the side of the latch bar.

The pivot pin in one expression of the invention is fixed in the bracket side walls and extends transversely between them, while in a second expression the end portion of the lever arm carries a transverse pin that extends equal to opposite sides. In either expression, that member which does not carry the pin is slotted by an opening of right-angle shape as viewed in side elevation that extends initially upwardly, that is, from the underside of the arm when horizontal, or from the underside of the bracket, and bends abruptly, extending horizontally. In the embodiment where the lever arm is slotted, which is my preferred embodiment, the slot extends toward the latch bar, while in the bracket the slot would extend away from the latch bar.

The distance from the side opening of the slotted lever arm to the end of the arm is just less than the distance from the pin in the bracket to the underside of the top wall, thereby allowing lateral insertion of the arm while being held vertical toward the latch bar, as the pin slides along the first part of the slot. After the arm is lowered to engage the pin under the upper end of the right-angled extension of the slot, it may be turned into the horizontal, in which position the distance from the slot opening to the end of the arm is just enough greater than the distance from the pin to the latch bar so that the arm cannot lift free of the pin, which remains captive in the extension portion of the slot.

In the embodiment where the bracket sidewalls are slotted and the pin is carried by the end portion of the lever arm, the distance from the side of the pin to the side edge of the end portion is sufficiently less than the distance from the slot opening in the lower edges of the bracket walls to the latch bar so that the arm can be inserted upwardly until the pin meets the horizontal extension of the slot, at which time the top end of the arm is just slightly spaced under the top wall of the bracket. When the arm is rotated into the horizontal while the pin is kept engaged in the extension portion of the slot, the pin is moved away from the latch bar by the cam-shaped end of the arm, so that the arm becomes captive in the bracket.

In both embodiments the lever arm cannot be shaken out or in any way dislodged from the bracket while it extends horizontally away from the latch bar, which relationship is readily maintained by the use of conventional clasps and seals well known in the art.

SPECIFIC EMBODIMENTS OF THE INVENTION

The invention will be described in greater detail in and by the discussion of its preferred embodiments which follows, reference being made to the accompanying drawing, in which:

FIG. 3 is a partial sectional view taken on line 3—3 of FIG. 1, in enlarged scale;

FIG. 4 is a view as in FIG. 3 with the opened door restrained from swinging fully open while a hazardous cargo condition exists;

FIG. 5 is a perspective view with the door restrained and the lever arm swung down, preparatory to its release;

FIG. 6 is a detail view showing the arm disconnected;

FIG. 7 is an elevation view in enlarged scale showing insertion of the lever arm in the bracket, which is partly cut away;

FIG. 8 is a view as in FIG. 7 showing the end portion of the arm engaged on the pivot pin;

FIG. 9 shows the arm of FIG. 7 rotated into the horizontal;

FIG. 10 is a detail sectional view taken on line 10—10 of FIG. 2 showing latch bar rotation-limiting means;

FIG. 11 is a view similar to FIG. 7 showing an alternative embodiment, the arm carrying a pivot pin and being inserted into a bracket having slotted sidewalls; and, FIG. 12 shows the arm of FIG. 11 captive when rotated into the horizontal.

Figure 1:
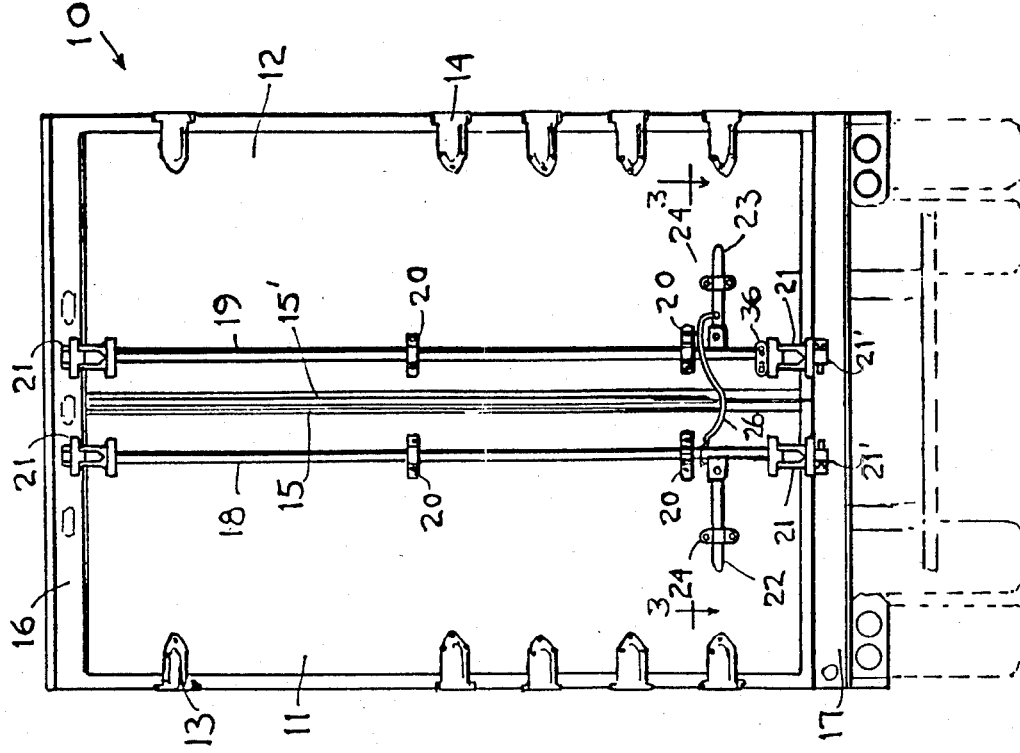
FIG. 1 is a rear elevation view of a cargo box having conventional door locking latch bars and keepers, and showing the restraint apparatus of the invention installed.

Referring to the drawing, a cargo box 10 shown in FIG. 1 is of conventional form, provided with left and right rear doors 11, 12 hingedly carried on frame-mounted sets of vertical-axis hinges 13, 14 and meeting along their inner vertical margins 15, 15'. Such doors generally extend slightly below the box floor level (not shown) and engage the lower margin of upper box frame 16 and the upper margin of lower box frame 17. Each door is provided with a latch-operating bar, hereinafter referred to as a latch bar, respectively designated 18, 19, rotatable in sets of vertically-spaced journals 20 intermediate their vertical extent, and are further journalled in upper and lower door-mounted bearings 21.

The extremities of each latch bar are conventionally fitted with a claw-like latch or jaw structure 21' that engages frame-mounted keepers 21'', the connection being made by imparting rotation to the latch bar by means of respective lever arms 22, 23 when these are brought closely adjacent the doors 11, 12. The latches may include cam-like elements that lock into recesses in the keepers to prevent lateral swaying or racking. To open the doors the holders 24, 25 that maintain the arms contiguous to their respective doors are released, and each arm is swung outwardly through an angle usually less than 45° and which may be only about 30°.

Figure 2:
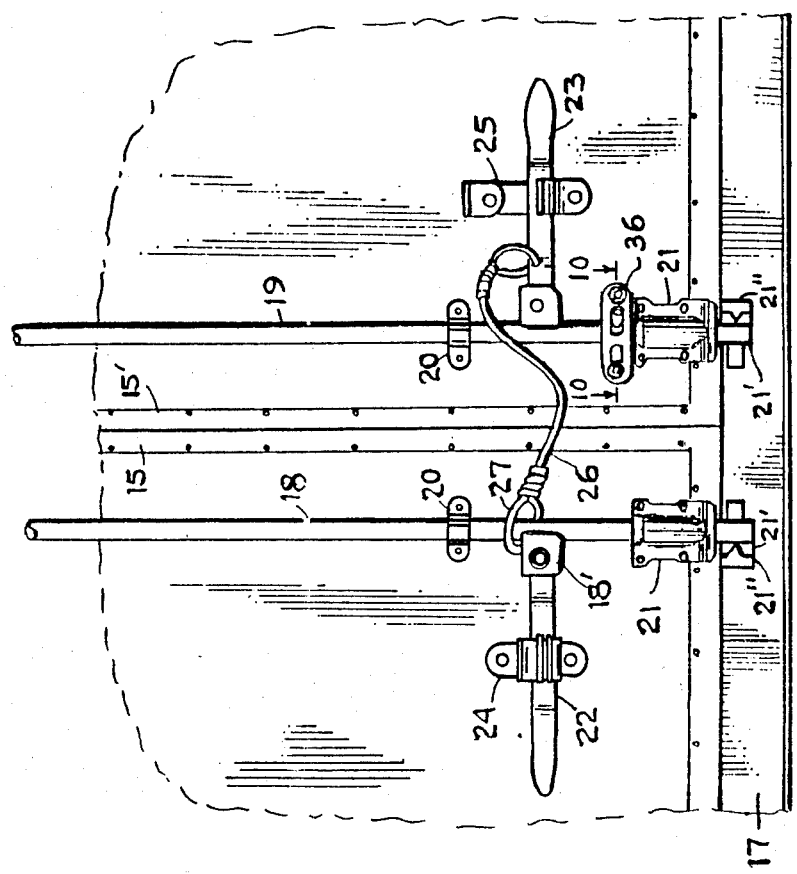
FIG. 2 is a view similar to FIG. 1 showing the lower ends of door latch bars of FIG. 1, and the restraint apparatus in place.

Referring additionally to FIGS. 2 and 3, a restraint apparatus according to the invention comprises a flexible link 26 adapted to be secured on the end doors of cargo boxes fitted with latch bars and lever arms of known type as described above. The manner in which the looped ends 27, 29 of the link are secured is illustrated in the view looking downward, FIG. 3, wherein end 27 is captively engaged around latch bar 18, and the right-hand end 28 is captively connected through hole 29 in lever arm 23 intermediate its ends. In this embodiment lever arm 22 is rotatable in known manner in the vertical plane about an axis in pivot pin 30 in lugs 18' permanently bonded to the side of latch bar 18, and is permanently engaged with the lugs. The right-hand arm 23 is modified according to the invention to be separably connectable with a two-sided bracket 31 having parallel spaced side walls 32, 33 and a closing top wall 34, bonded to the side of latch bar 19. A locking pin 35 in a first embodiment is fixed in the bracket side walls, or alternatively is fixed in the end portion of lever arm 23, the member which does not carry the pin being transversely slotted for selective engagement of the members as will be described in greater particular hereinafter.

Arm 23, when horizontal and with its end portion inserted in bracket 31, functions identically to conventional arm 22 to provide a means for rotating latch bar 19. The manner in which the restraint apparatus operates may be understood by reference to FIGS. 4 through 6. As the latch bar 19 is released from its keepers 21' by a fractional turn rotation of arm 23 in a clockwise direction, for example to a latch-release position about 40° outward from the latched position, the right-hand door 12 is allowed to swing open. The restraint link 26 is made taut when the door opens a short distance, for example about 10 cm, the link bending over the door margin 15'. In this position, if an outward force is being exerted on the door by shifted cargo, the link pulls end portion of arm 23 against latch bar 19 while also tending to turn the arm and latch bar clockwise. To prevent further rotation of the latch bar a rotation-limiting stop means 36 secured on door 12 is carried by latch bar 19, the stop being set to arrest swing of arm 23 just after the latches are released, as will be described in connection with FIG. 10.

When it is found to be safe to remove arm 23 from bracket 31, the arm is swung downwardly about a locking pin 35 as in FIG. 5, and is withdrawn laterally as in FIG. 6, the embodiment illustrated being that in which the end portion of the arm carries slot portions 37, 38 best seen in FIGS. 7 through 9.

Slot 37 opens to the underside of arm 23 when the arm is horizontal as shown in FIG. 9, the slot extending transversely of the length of the arm, and connecting with extension 38 which is at right angles to portion 37 and extends toward the end 39 which is contiguous to latch bar 19. In this position locking pin 35 is in the extension portion 38, holding the arm captive in bracket 31.

The relative distances from the pin to the underside of top wall 34 and to latch bar 19 are so correlated with the distances of slot 37 to arm end 39 and with the distance of the extension portion 38 from end 39, that the arm can be engaged with the pin only when vertical by moving the arm laterally between the wall portions 32, 33, as in FIG. 7, and so that after pin 35 is seated in the end of slot 38 as in FIG. 8 the arm can be turned into the horizontal. As seen in FIG. 9, the arm is captive on pin 35 whether end 39 is contiguous to the latch bar, or pin 35 is at the end of slot portion 38.

As indicated earlier, when door 12 is forced outwardly by cargo, the torque exerted by link 26 on lever arm 23 would tend to accelerate the arm rapidly while the latch claws are released, the arm sweeping a path likely to cause it to impact anyone standing near the door. If the angle of powered sweep is minimized, for example held to only a few degrees beyond the angular position at which the latch bar is released from keepers 21', safety is greatly enhanced and shock to the link and both latch bars is kept low. Referring to FIG. 10, a form of rotation-limiting stop 36 for this purpose comprises a flat strap 40 and a U-shaped flanged bracket 41 adapted to be assembled on opposite sides of the latch bar 19 with the bar closely journalled in the bend of the U. Left and right bolt holes 42, 43 near the ends of strap 40 and corresponding bolt holes 44, 45 in the ends of bracket 41 are provided to receive bolts 46, 47 passed outwardly through holes 48, 49 in door 12, the outer ends of the bolts being threadedly engaged by lock nuts 50. Strap 40 is recessed at 51, the recess extending along the left half horizontally and terminating at its right end just to the right of the strap mid-length at 52. The U-portion of bracket 41 is recessed along one leg of the U, at 53, specifically along the right leg commencing just to the left of the midpoint of the arcuate portion at 54, and extending horizontally to the right-hand flange but short of bolt hole 45.

The positions of slot ends 52 and 54 are so related that a roll-pin 55 passed diametrally through bores 56, 57 in latch bar 19 which is illustrated as a tube, will have its ends in contact with these slot ends, serving thereby to fix rotation limits for the latch bar.

In order to accomodate various forms of latch claws and keepers, the limiting apparatus 36 is adapted to be installed by first rotating bar 19 to the desired angular position just beyond the latch release position, then drilling out the bores 56, 57 while the bar is held in this angular position. Further adjustment of strap 40 may be made by slightly enlarging bolt holes 42, 43 laterally so that the strap may be moved to cause the roll pin 55 to bear equally against both slot ends.

In the alternative embodiment of FIGS. 11 and 12, equivalent captive holding of arm 123 in bracket 131 when the arm is horizontal is effected by disposing slot portions 137 and 138 which meet at right angles or nearly at right angles in the bracket side walls of bracket 131, and fixing pin 135 transversely of an end portion of arm 123. The far wall 133 of bracket 131 is shown in full. The new wall is removed to show bracket 131 in section.

Slot portions 137 open into the lower edges of both side walls, as indicated in wall 133, and extend upwardly, meeting the angled portions 138 which extend away from the latch bar 19. The distances of pin 135 from the end 139 of the arm and from the pin to the underside of arm 123 are so correlated with the distances from slot portion 138 to bracket top wall 134 and from slot 137 to latch bar 19, that the arm end portion may be inserted upwardly while held in the vertical, as shown in FIG. 11, to engage pin 135 in slots 137, and may then be turned into the horizontal with pin 135 captive in slot 138 as shown in FIG. 12. The profile of arm 123 between its end 139 and the upper edge is rounded, generally following a curve of nearly a constant radius distance, allowing the arm to be turned into the horizontal when pin 135 bears against the upper edge of slot 138.

It will be apparent that when arm end 139 bears against the latch bar, pin 135 cannot descend from vertical slot 137. If the arm is moved away from the latch bar to the limit at which pin 135 is at the end of slot portion 138, the arm remains captive.

I claim:

1. In a cargo box comprising an end frame having left and right vertical side members and top and bottom horizontal members, said members defining an end opening of said box, a pair of doors having vertical side edges pivotally mounted on said side members and having opposite vertical edges meeting centrally of said opening when said doors are closed on said opening, a vertical latch-actuating bar carried by each said door adjacent said opposite vertical edge, each said bar having latch means fixed on its ends, latch keeper structure carried on said top and bottom frame members engageable by said latch means, said bars having brackets and lever arms connectable with each bracket for effecting opening and closing rotations of respective bars by turning a lever arm in the horizontal plane, the improvement wherein a restraint link is connected by one end with the bar of a first door of said pair and by its other end with the lever arm of the second door and has a length such that when the lever arm of the second door is turned to release respective latches for opening said second door the opening door, swing is limited by said link to a predetermined minor amount, and wherein the second lever arm is rotatable relative to its associated bracket in a vertical plane and is disconnectable from the bracket only when the lever arm is substantially vertical.

2. The improvement as set forth in claim 1 wherein the latch-actuating bar of said second door includes stop means limiting the latch-release rotation of the bar to an angle just sufficient to release bar latches from their keepers, and said angle is less than about 45°.

3. The improvement as set forth in claim 2 wherein said bracket of said second door extends laterally from its associated bar away from said meeting edge and wherein one of said lever arm and said bracket has a pin transversely fixed therein and the other one of said lever arm and said bracket has a recess formed transversely therethrough, for selective engagement of the lever arm and the bracket, the recess comprising two straight connected portions meeting at right angles extending respectively vertically and horizontally and the recess opening to the underside of the lever arm when the arm is horizontal or opening to the underside of the bracket.

4. The improvement as set forth in claim 3 wherein said bracket is of U-shape having legs disposed in vertical planes and spaced horizontally apart a distance sufficient to permit insertion of the lever arm therebetween, and connected by an integral top wall, the legs having opposed recesses comprising a vertical recess extending upwardly from the bottom edges of said legs and then extending horizontally away from the bar, and said lever arm has a transverse pin projecting to either side of the arm and disposed slightly further away from one end of the arm than the distance from the said vertical recess portion to said bar.

5. The improvement as set forth in claim 3 wherein said bracket is of U-shape, the U-legs being disposed in vertical planes and spaced horizontally apart a distance sufficient to permit insertion of the lever arm therebetween, and connected by an integral top wall, the legs carrying a transverse pin disposed horizontally and the lever arm having a recess, wherein the distance from the recess portion opening into one edge of the arm to the end of the arm is slightly greater than the distance from said pin to said bar.

6. Door restraint apparatus comprising, a peripheral frame defining a door opening, a pair of doors each hingedly connected by one vertical margin along one vertical side of said frame and having an opposite vertical margin meeting the opposite vertical side of a door when the doors are closed on said opening, journal means mounted on each door, latch means for locking each door in closed position comprising a vertical latch bar having claws engagable by rotation of the latch bar in said journal means with keepers fixed on upper and lower sides of said frame, said latch bar having a bracket, a recess in said bracket opening laterally away from the bar and opening also downwardly and extending the horizontal length of the bracket, a transverse slot communicating with the recess having an initial slot portion shorter than the length of the bracket opening horizontally to either side of the bracket and having an angled portion opening at right angles to said recess and extending from an end of said initial slot portion remote from the bar, link means permanently connected by one end with a margin of one door and selectably connectable by its other end with the other door of the pair adjacent the opposite vertical margin thereof and of a length to limit door opening swing when said other end is connected to said other door, said selectable connection comprising a lever arm for actuating the latch bar of said other door having said other end of said link fixed in the arm and having a flattened arm end portion receivable in said bracket by insertion in said recess and having a transverse pin in said end portion extending to either side of said arm freely slidable in said slot, whereby when the arm is vertical, said end portion may be inserted into said recess from underneath with said transverse pin guided in said angled portion of said slot, and whereby when said arm is thereafter rotated to the horizontal said arm becomes captive in said bracket with said transverse pin in said initial slot portion.

* * * * *